COMBINED CONVERTER AND OSCILLATOR CIRCUIT
Filed Nov. 20, 1945
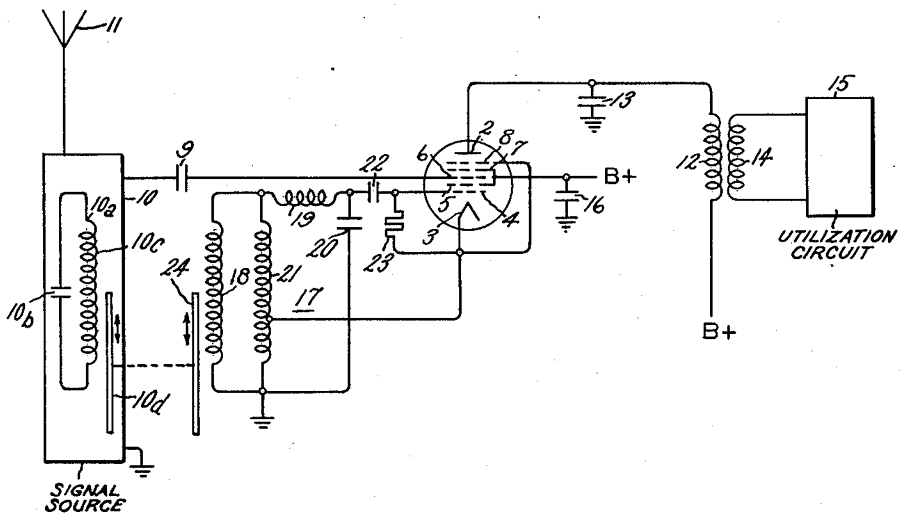
Inventor:
Joseph A. Worcester, Jr.
by Merton D. Moore
His Attorney.

Patented May 22, 1951

2,554,230

UNITED STATES PATENT OFFICE 2,554,230

COMBINED CONVERTER AND OSCILLATOR CIRCUIT

Joseph A. Worcester, Jr., Fairfield, Conn., assignor to General Electric Company, a corporation of New York Application November 20, 1945, Serial No. 629,898

2 Claims. (Cl. 250—20)

My invention relates to combined converter and oscillator circuits and more particularly to permeability tuned circuits for magnetically coupled oscillators of the Hartley type. The invention is particularly applicable to combined local oscillator and converter circuits using multi-grid converter tubes.

The invention has for a general object the provision of a new and improved permeability tuned oscillator circuit.

It is a further object of the invention to provide a new and improved combined converter and local oscillator circuit.

It is a still further object of my invention to provide a new and improved combined pentagrid converter and local oscillator of the permeability tuned cathode feed-back type in which the oscillatory cathode voltage is substantially constant throughout the tuning range.

The invention itself will be more fully understood and its objects and advantages further appreciated by referring now to the following detailed specification taken in conjunction with the accompanying drawing, the single figure of which is a schematic circuit diagram partially in block form of a superheterodyne radio receiving apparatus including a combined converter and local oscillator of the permeability tuned type embodying my invention.

Referring now to the drawing, I have shown a combined converter and local oscillator comprising an electron discharge device 1 having an anode 2, a cathode 3, and a plurality of control electrodes 4, 5, 6, 7, and 8. The control electrode 6 is shown connected through a coupling capacitor 9 to a suitable source 10 of signal modulated carrier waves. By way of example, the source 10 may comprise an antenna 11 and a plurality of radio frequency amplifying stages for received carrier waves modulated in any desired characteristic, such as amplitude, frequency, or phase.

I have shown the signal source 10 as including a permeability tuned radio frequency circuit 10*a*. The circuit 10*a* comprises a capacitor 10*b* and an inductor 10*c* provided with a movable iron core 10*d*. The anode 2 of the discharge device 1 is connected to a converter output circuit comprising an intermediate frequency transformer winding 12 connected between the anode 2 and a suitable source of positive unidirectional potential indicated upon the drawing by the symbol B+. The winding 12 is tuned to the intermediate frequency by a tuning capacitor 13. A secondary winding 14 associated with the transformer winding 12 supplies the signal modulated intermediate frequency carrier waves to any suitable utilization circuit 15. The utilization circuit 15 may by way of example comprise a suitable number of stages of intermediate frequency amplification, a demodulator stage, suitable stages of signal frequency amplification, and a signal reproducing device such as a loud speaker or the like.

Referring now to the discharge device 1, it will be observed that the electrodes 4 and 6 are control electrodes and the electrodes 5 and 7 are screen electrodes connected together and to a suitable source of positive unidirectional potential B+. The screen electrodes 5 and 7 are also connected to ground for oscillatory currents through a by-pass capacitor 16. The electrode 8 is a suppressor grid which is connected directly to the cathode 3 in the usual manner.

For the purpose of generating local oscillations to be mixed with the radio frequency oscillations impressed upon the control grid 6, the cathode 3 and the electrodes 4 and 5 are connected as a magnetically coupled triode oscillator, the screen electrode 5 serving as an anode in the oscillator circuit with respect to the control electrode 4 and cathode 3.

The local oscillations generated are injected into the converter by the control grid 4 and mixed with oscillations from the source 10 at a different frequency to obtain the intermediate frequency converter output. The oscillator circuit comprises a tuned circuit 17 having one terminal coupled to the control electrode 4 and the opposite terminal coupled to the screen electrode 5 acting as an anode. It will of course be understood that for alternating currents the electrode 5 is coupled to the anode 2 through the electron discharge stream in the device 1. A point of intermediate potential in the resonant circuit 17 is connected to the cathode 3.

More specifically, the resonant circuit 17 comprises a variable inductor 18 connected in series with a trimming inductor 19 across a tuning capacitor 20. An impedance element shown as a second inductor 21 is connected in parallel circuit relation with the inductor 18 and acts as a voltage divider to supply an oscillatory potential from an intermediate point thereon to the cathode 3. The common terminal of the inductor 18 and the capacitor 20 is grounded and thus coupled for oscillatory potentials to the electrode 5 through the capacitor 16. The opposite terminal of the capacitor 20 is connected through a grid coupling capacitor 22 to the control electrode 4. The control electrode 4 is also connected to the cathode 3 through a grid bias resistor 23. Variation in the inductance of the inductor 18 is effected by a movable iron core 24 arranged to vary the permeability of the coil 18.

The core 24 is mechanically coupled to the core 10*d* so that both cores are moved simultaneously in tuning the receiver. It will be understood by those skilled in the art that where such gang tuning of radio frequency and local oscillator circuits is utilized in a superheterodyne receiver, it is necessary to so adjust the circuits that the intermediate frequency remains unchanged throughout the tuning range. Proper operation of the ganged tuning circuits in this manner is called "tracking." The padder coil 21 is provided to ensure proper "tracking" as the cores 10*d* and 24 are moved together.

In operation, the circuit from the electrode 5 to the cathode 3 through the capacitor 16 and the lower portion of the coil 21 serves as an oscillator anode circuit with the electrode 5, the effective anode grounded for oscillatory potentials. The oscillator control electrode circuit from the control electrode 4 through the upper portion of the coil 21 to the cathode 3 is magnetically coupled to the oscillator anode circuit in that each circuit includes a portion of the resonant circuit 17. The regenerative feedback provided by this coupling sustains oscillations upon the cathode 3 and control electrode 4 at the frequency to which the circuit 17 is tuned. The tuning of the circuit 17 may be varied, thereby to vary the frequency of the local oscillations, by varying the permeability of the coil 18 through manipulation of the movable iron core 24. In this oscillator circuit the effective anode 5 is grounded for oscillatory potentials and feedback is from the cathode 3. The oscillatory voltage between cathode and ground is that across the lower portion of the coil 21. The local oscillations thus maintained between the control electrode 4 and the cathode are mixed in the discharge device 1 with the received carrier oscillations impressed upon the control electrode 6, so that the difference or intermediate frequency appears in the converter output circuit 12, 13.

It will now be evident that the cathode 3 and electrodes 4 and 5 of the device 1 operate as separate triode oscillator and that my improved coupling circuit will maintain constant feedback voltage if used with a separate oscillator tube, using the anode or cathode feedback. The invention has particular utility however in a combined cathode feedback oscillator and converter circuit where the converter transconductance is a function of the oscillatory voltage between cathode and ground. In such a converter circuit my invention provides substantially constant conversion gain throughout the tuning range.

The effect of my invention will be better appreciated by comparing its operation with the operation of the oscillator if the cathode 3 were connected to an intermediate point on the inductor 18 rather than the inductor 21. If the cathode were connected to an intermediate point on the variable permeability coil 18, the oscillatory voltage between the cathode 3 and ground would vary in a non-linear manner as the core 24 was moved to tune the oscillator throughout its frequency range. Such voltage variation at a tap on the coil 18 arises from the fact that the proportion of the total voltage appearing between such tap and ground first increases and then decreases as the core is moved into the coil. Such an arrangement with the cathode tapped directly to the coil 18 is particularly disadvantageous in a converter circuit because it is known that in a multi-grid converter of the type here shown the conversion transconductance decreases rapidly as the oscillatory voltage between cathode and ground exceeds two volts.

Thus it is evident that if the tap is selected on the coil 18 to provide optimum cathode to ground voltage at the highest frequency, the excitation becomes too high as the core is moved in toward the tap location to increase the inductance and decrease the frequency. If on the other hand, the number of turns between the tap and ground is reduced, the tube will fail to oscillate at the high and low frequency ends of the range.

It will now be evident that in accordance with my invention any appreciable variation in ground-to-cathode voltage resulting from permeability tuning of the coil 18 is eliminated by connecting across the coil a voltage dividing impedance and connecting the cathode 3 to an intermediate point on this voltage divider, rather than upon the coil 18 itself. Since the voltage dividing impedance 21 detects only the total voltage across the coil 18 and since the total voltage does not vary appreciably throughout the range, the voltage between the tap on coil 21 and ground remains substantially constant as the coil 18 is tuned throughout its range. In this way the conversion transconductance of the discharge device 1 is maintained within a favorable range throughout a wider range of frequency variation.

It will be noted that my invention does not require the inclusion of apparatus in addition to that commonly used in oscillator circuits of the subject type. In gang tuning of a superheterodyne receiver the padder coil 21 is required for proper "tracking" between the radio frequency tuning circuits and the oscillator tuning circuits, so that the intermediate frequency will remain unchanged throughout the tuning range. In accordance with my invention therefore the cathode tap may be made in a position already available.

While I have described only a preferred embodiment of my invention by way of illustration, many modifications will occur to those skilled in the art and I therefore wish to have it understood that I intend in the appended claims to cover all such modifications as fall within the true spirit and scope of my invention.

What I claim as new and desire to secure by Letters Patent of the United States, is:

1. In a tunable superheterodyne receiver, a combined converter and local oscillator comprising an electron discharge device having a cathode, at least three control electrodes and an anode, tunable input means for impressing signal-modulated waves, lying within a first frequency band, between a first one of said electrodes and a point of reference potential, tunable circuit means interconnecting a second and a third of said electrodes and said cathode for operation as an oscillator generating waves within a second frequency band, said circuit means comprising a first, preset inductance, a second, variable inductance and a preset capacitor all connected in parallel, said second inductance being capable of substantially wider range of reactance variation than either said first inductance or said capacitor, means for varying said reactance of said second inductance over said range in unison with variation in tuning of said tunable input means thereby to tune said receiver over a broad range of frequencies one terminal of said circuit means being connected to said second electrode and the other terminal being connected to said point, means for energizing said third electrode for operation as the oscillator anode and for connecting it to said point for oscillation frequencies, said cathode being connected to an intermediate potential point on said first inductance, tuning means for varying said second inductance to tune said oscillator over said second band, and an output circuit connected between said anode and said point responsive to waves of frequency equal to the difference in frequency between the waves in said first and second bands.

2. In a tunable superheterodyne receiver, a combined converter and permeability-tuned local oscillator comprising an electron discharge device including a cathode, an oscillator grid, a screen grid, a signal input grid and an anode, means comprising a tunable input circuit for impressing signal-modulated waves, lying within a first frequency band, between said signal input grid and a point of reference potential, tunable circuit means interconnecting said oscillator grid, said screen grid and said cathode for operation as an oscillator generating waves within a second frequency band, said circuit means comprising a variable inductance, a fixed inductance and a capacitor all connected in parallel, one terminal of said circuit means being connected to said oscillator grid and the other terminal being connected to said point, means for energizing said screen grid for operation as the oscillator anode and for connecting it to said point for oscillation frequencies, said cathode being connected to an intermediate tap point said fixed inductance, means for tuning said oscillator over said second band by varying the permeability of said variable inductance, means for operating said tunable input circuit and oscillator tuning means in unison, and an output circuit connected between said anode and said point responsive to waves of frequency equal to the difference in frequency between the waves in said first and second bands.

JOSEPH A. WORCESTER, Jr.

REFERENCES CITED

The following references are of record in the file of this patent:

UNITED STATES PATENTS

| Number | Name | Date |
|---|---|---|
| 1,917,237 | Barbulesco et al. | July 11, 1933 |
| 1,947,229 | Runge | Feb. 13, 1934 |
| 2,163,646 | Ware | June 27, 1939 |
| 2,165,468 | Farrington | July 11, 1939 |
| 2,207,254 | Holst | July 9, 1940 |
| 2,222,387 | Wheeler | Nov. 19, 1940 |
| 2,231,389 | Koffyberg | Feb. 11, 1941 |
| 2,239,756 | Riddle | Apr. 29, 1941 |
| 2,263,613 | Conron | Nov. 25, 1941 |
| 2,289,670 | McClellan | July 14, 1942 |
| 2,296,098 | Farfel | Sept. 15, 1942 |
| 2,320,483 | Stocker | June 1, 1943 |
| 2,342,491 | Rankin | Feb. 22, 1944 |
| 2,425,454 | Bloch | Aug. 12, 1947 |